United States Patent [19]

Koneke

[11] Patent Number: 5,752,470
[45] Date of Patent: May 19, 1998

[54] COLLAPSIBLE STRUCTURE

[76] Inventor: Walter Koneke, 15 Buffin La., Blue Point, N.Y. 11715

[21] Appl. No.: 554,598

[22] Filed: Nov. 6, 1995

[51] Int. Cl.$^6$ .................................................. A01K 1/03
[52] U.S. Cl. ............................ 119/499; 229/117.05
[58] Field of Search .............................. 119/165, 168, 119/482, 498, 499; 229/117.05, 117.06

[56] References Cited

U.S. PATENT DOCUMENTS

| | | | |
|---|---|---|---|
| D. 340,551 | 10/1993 | Mitchell, Sr. | D30/109 |
| D. 347,304 | 5/1994 | Hellem | D30/161 |
| D. 349,366 | 8/1994 | Kuhn et al. | D30/108 |
| D. 371,641 | 7/1996 | Crowley | D30/108 |
| 752,584 | 2/1904 | Patrick | 229/117.06 |
| 1,064,347 | 6/1913 | Kovacs | 119/482 |
| 2,485,028 | 10/1949 | Bauernfreund et al. | 229/117.05 X |
| 3,199,762 | 8/1965 | Coons | 229/117.06 X |
| 3,280,796 | 10/1966 | Hatcher | 119/499 |
| 4,006,713 | 2/1977 | Hawley, III | 119/498 |
| 4,014,292 | 3/1977 | Coughlin et al. | 119/168 |
| 4,109,427 | 8/1978 | O'Brian et al. | 119/499 X |
| 4,177,761 | 12/1979 | Bellocchi, Jr. | 119/482 |
| 4,181,095 | 1/1980 | Sylogye | 119/165 |
| 4,195,593 | 4/1980 | Dunn | 119/499 |
| 4,347,807 | 9/1982 | Reich | 119/499 |
| 4,445,459 | 5/1984 | Julie | 119/28.5 |
| 4,520,758 | 6/1985 | Pfriender | 119/499 |
| 4,527,512 | 7/1985 | Sugiura | 119/499 |
| 4,576,116 | 3/1986 | Binkert | 119/498 |
| 4,590,885 | 5/1986 | Sugiura | 119/497 |
| 4,787,335 | 11/1988 | Carlyon | 119/170 |
| 4,792,082 | 12/1988 | Williamson | 119/168 X |
| 4,803,951 | 2/1989 | Davis | 119/497 |
| 4,827,872 | 5/1989 | Sommers | 119/482 |
| 4,930,445 | 6/1990 | Chestnut | 119/485 |
| 4,940,016 | 7/1990 | Heath | 119/168 |
| 5,003,923 | 4/1991 | Morgan | 119/482 |
| 5,014,649 | 5/1991 | Taft | 119/168 |
| 5,027,748 | 7/1991 | Wolak | 119/498 X |
| 5,050,536 | 9/1991 | Baker | 119/499 |
| 5,094,190 | 3/1992 | Ratcliff et al. | 119/173 |
| 5,097,799 | 3/1992 | Heitfeld et al. | 119/173 |
| 5,167,205 | 12/1992 | Bell et al. | 119/168 |
| 5,170,745 | 12/1992 | Burdette, Jr. | 119/497 |
| 5,176,108 | 1/1993 | Jenkins et al. | 119/173 |
| 5,335,618 | 8/1994 | Zarola | 119/498 |
| 5,383,422 | 1/1995 | Morris | 119/499 |
| 5,400,743 | 3/1995 | Buckley | 119/498 |
| 5,524,326 | 6/1996 | Markowitz | 119/482 |
| 5,582,135 | 12/1996 | Bellows | 119/498 X |

*Primary Examiner*—Robert P. Swiatek
*Assistant Examiner*—Elizabeth Shaw
*Attorney, Agent, or Firm*—Kuhn And Muller

[57] ABSTRACT

The collapsible system can also be used for portable pet houses most types of small free standing buildings, as well as for emergency housing in times of disasters. The collapsible structure is better than a tent, because it has real walls, a roof, and has the feel of a home. The system can also be used for permanent housing, depending on building codes and types of materials used. By making the structure portable, it is easy to move from place to place. It can also cut down on cost of moving large and bulky objects, and also can cut down on packaging material. In the case of the housing, it cuts down on the cost of shipping. The record time that it takes to put up a collapsible structure also cuts down on manpower needed to set it up, thereby increasing quality control, because the collapsible structure can be made in a controlled factory environment and one can ship considerably more than what one could normally ship.

19 Claims, 5 Drawing Sheets

COLLAPSIBLE STRUCTURE

FIELD OF THE INVENTION

The present invention relates to collapsible structures for pet houses and furniture.

BACKGROUND OF THE INVENTION

From cardboard boxes to disposable dog houses, such as U.S. Pat. No. 5,383,422 of Morris, collapsible enclosures have been used for many applications. Most have been purpose-designed for a particular application or class of applications.

Among the prior art patents include U.S. Pat. No. 5,335,618 of Zarola which discloses a collapsible animal enclosure and U.S. Pat. No. 5,176,108 of Jenkins which is a boron-based odor control animal litter. U.S. Pat. No. 5,170,745 of Burdette consists of a pet carrying bag and U.S. Pat. No. 5,167,205 of Bell, which is a convertible disposable animal litter container. U.S. Pat. No. 5,097,799 of Heitfeld describes an odor control animal litter device containing sodium fluoride and U.S. Pat. No. 5,094,190 of Ratcliff describes a boron-based odor control animal litter.

U.S. Pat. No. 5,014,649 of Taft describes a cat litter box with integral collapsible enclosure and U.S. Pat. No. 5,003,923 of Morgan describes a heated pet house. U.S. Pat. No. 4,940,016 of Heath describes a unitary collapsible and disposable pet litter container and U.S. Pat. No. 4,930,445 of Chestnut describes a portable pet house. U.S. Pat. No. 4,803,951 of Davis discloses an enclosure for pets and U.S. Pat. No. 4,787,335 of Carlyon describes a litter box. U.S. Pat. No. 4,590,885 of Sugiura consists of a collapsible animal cage and U.S. Pat. No. 4,576,116 of Binkert consists of a collapsible house for cats.

U.S. Pat. No. 4,527,512 of Sugiura describes a collapsible animal cage. U.S. Pat. No. 4,445,459 of Julie describes an animal pet porch and container. U.S. Pat. No. 4,347,807 of Reich describes a cat condominium and method of making same.

Moreover, U.S. Pat. No. 4,195,593 of Dunn describes a portable dog house and U.S. Pat. No. 4,181,095 of Sylogye describes a screen assembly for an animal litter station. U.S. Pat. No. 4,177,761 of Bellocchi describes a pet play house, U.S. Pat. No. 4,014,292 of Coughlin describes a collapsible and disposable sanitary pet litter container and U.S. Pat. No. 4,006,713 of Hawley describes a collapsible dog house.

The prior art patents do not describe a simple collapsible structure with inward side folds which easily folds flat for storing or transportation.

OBJECTS OF THE INVENTION

It is therefore an object of the present invention to describe a universal method for the design of collapsible enclosures for a wide variety of applications.

It is a further object of this invention to illustrate the method with applications such as pet enclosures, closets and even housing for people.

It is yet another object to improve over the disadvantages of the prior art.

SUMMARY OF THE INVENTION

In keeping with these objects and others which may become apparent, the present invention relates to a structure of a simple collapsible system, wherein in using the system the structure will collapse by pushing in the sides from the middle, and by letting the front and back fold onto each other.

The system can be used for making collapsible dog or cat pet houses, collapsible furniture, such as bookcases, cabinets, dressers, chests, beds and appliances such as stoves, refrigerators, showers, etc. It does not matter how thin or thick, sides, front or back are. Various types of hinges may be used for opening and folding the collapsible structures.

The collapsible structures, such as a foldable closet, etc. can be made of plastic, cardboard or thin wood. It can also be made as deep as a standard closet. When folded, the collapsible closet is about one inch thick and weighs only about thirty pounds. Anyone can install the closet in about one minute and the closet folds up in about the same time. Therefore, the collapsible closet can be moved from place to place easily.

DESCRIPTION OF DRAWINGS

The present invention can best be understood in conjunction with the accompanying drawings, in which.

DETAILED DESCRIPTION OF THE DRAWINGS

Figure 1:
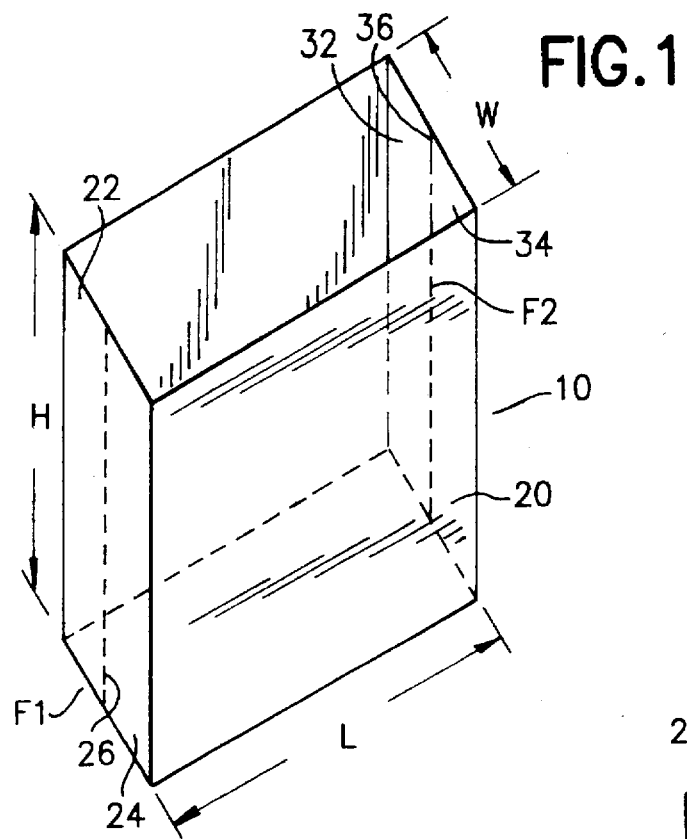
FIG. 1 is a perspective view of the vertical wall portions of a collapsible structure wherein the walls are shown in an open position of use.

FIG. 1 shows the general folding design for the structure enclosure 10 of the present invention. A generally rectangular enclosure has a width, W, a length, L, and height H. Structure enclosure 10 is probably made of a lightweight rigid material such as corrugated cardboard which can be folded as shown by creating two inward folds, F1, F2. Fold F1 includes fold sheets 22, 24 folded at hinge 26. Fold F2 includes sheets 32, 34 folded at hinge 36. Enclosure 10 fits the size of a single face 20 (H×L) and four times the material thickness when collapsed or folded flat as in FIG. 3.

Figure 2:
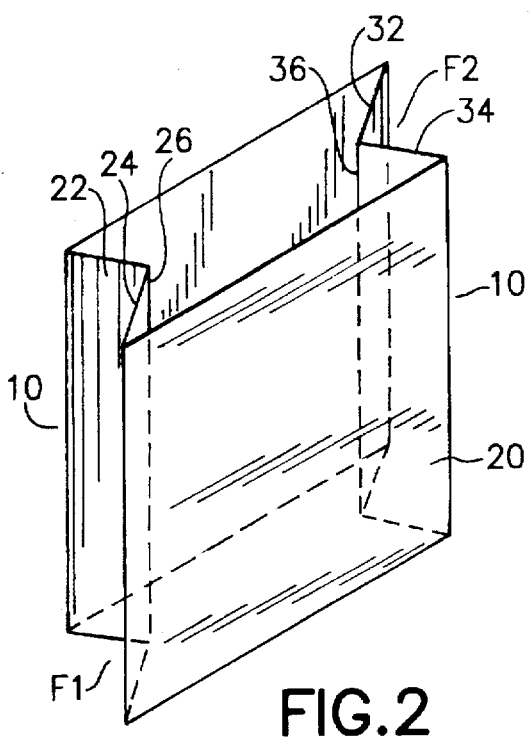
FIG. 2 is a perspective view of the vertical wall portions of a collapsible structure as in FIG. 1, wherein the walls are shown in a partially collapsed position.

FIG. 2 shows enclosure 10 partially folded, and FIG. 1 shows the enclosure 10 fully erected or opened. No top or bottom are shown although they can be added.

Figure 3:
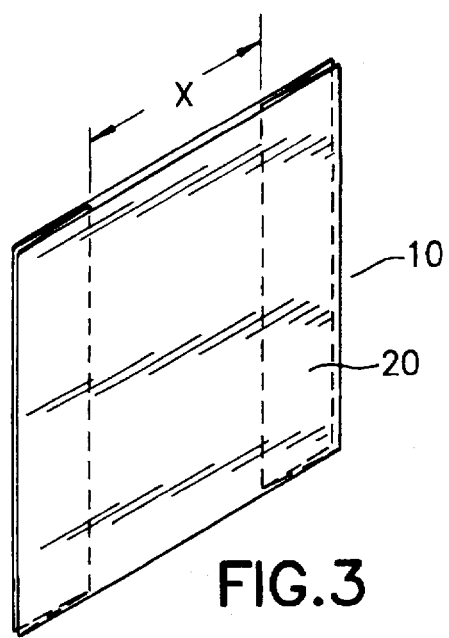
FIG. 3 is a perspective view of the vertical wall portion of a collapsible structure as in FIG. 1, wherein the walls are shown in a completely collapsed position.

In FIG. 3, inside folds sheets 22, 24 and 32, 34 are shown as having width W2 since folds F1, F2 as folded on the center of the width W, which denotes the space between hinges 26, 36 of inner folds F1, F2 respectively. This is nominally L minus W. A constraint to insure that the folded thickness is approximately four times the material thickness is that L, the length, has to be longer than W, the width. If this constraint is not followed, hinges 26, 36 of the inner folds F1, F2 will overlap thereby forcing the center of collapsed structure 10 to be at least six material thicknesses.

Figure 4A:
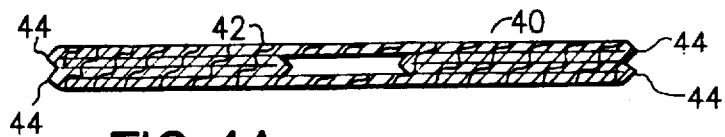
FIG. 4A is a top plan view of the vertical wall portions of a collapsible structure as in FIG. 1, wherein the walls are shown in a completely collapsed position, and further wherein the edges are folded.
Figure 4B:
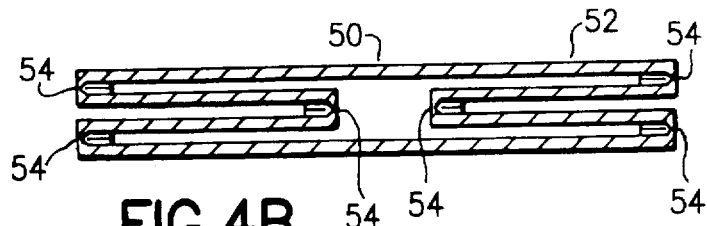
FIG. 4B is a top plan view of an alternate embodiment for the vertical wall portions of a collapsible structure, wherein the walls are shown in a completely collapsed position; and further wherein the edges are stored with tape hinges.
Figure 4C:
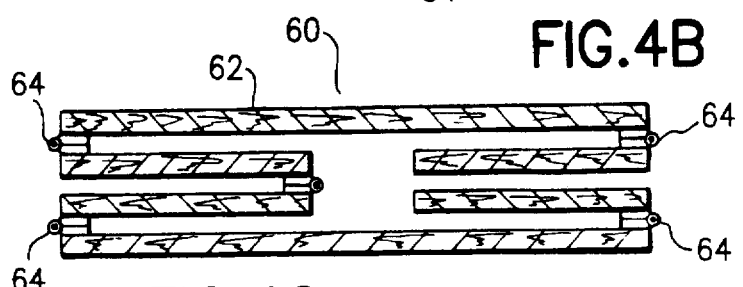
FIG. 4C is a top plan view of a further alternate embodiment for the vetical wall portions of a collapsible structure, wherein the walls are shown in a collapsed position, and further wherein the edges are hinged with pin hinges.

FIGS. 4A, 4B, 4C show top views of three types of materials and the hinging possibilities that are compatible with them.

FIG. 4A shows folded material 40, such as single weight corrugated cardboard panels 42 where folds 41 are in the longitudinal direction of the corrugations, that is, the direction that folds easily. No special add-on hinges are required.

FIG. 4B shows somewhat thicker material 50 such as double weight cardboard, hardboard, plywood, corrugated styrene, etc. Here the method of construction is to cut panels 52 or score them deeply; then panels 52 are attached or reinforced with a strong pliable tape which acts as a fabric hinge 54.

FIG. 4C shows thicker material 60 of panels 62 made of heavy wood panels or other thick material. Shown in end view is the placement of standard "loose pin" hinges 64. Piano hinges may also be placed as shown if they are used instead.

Figures 5, 6:
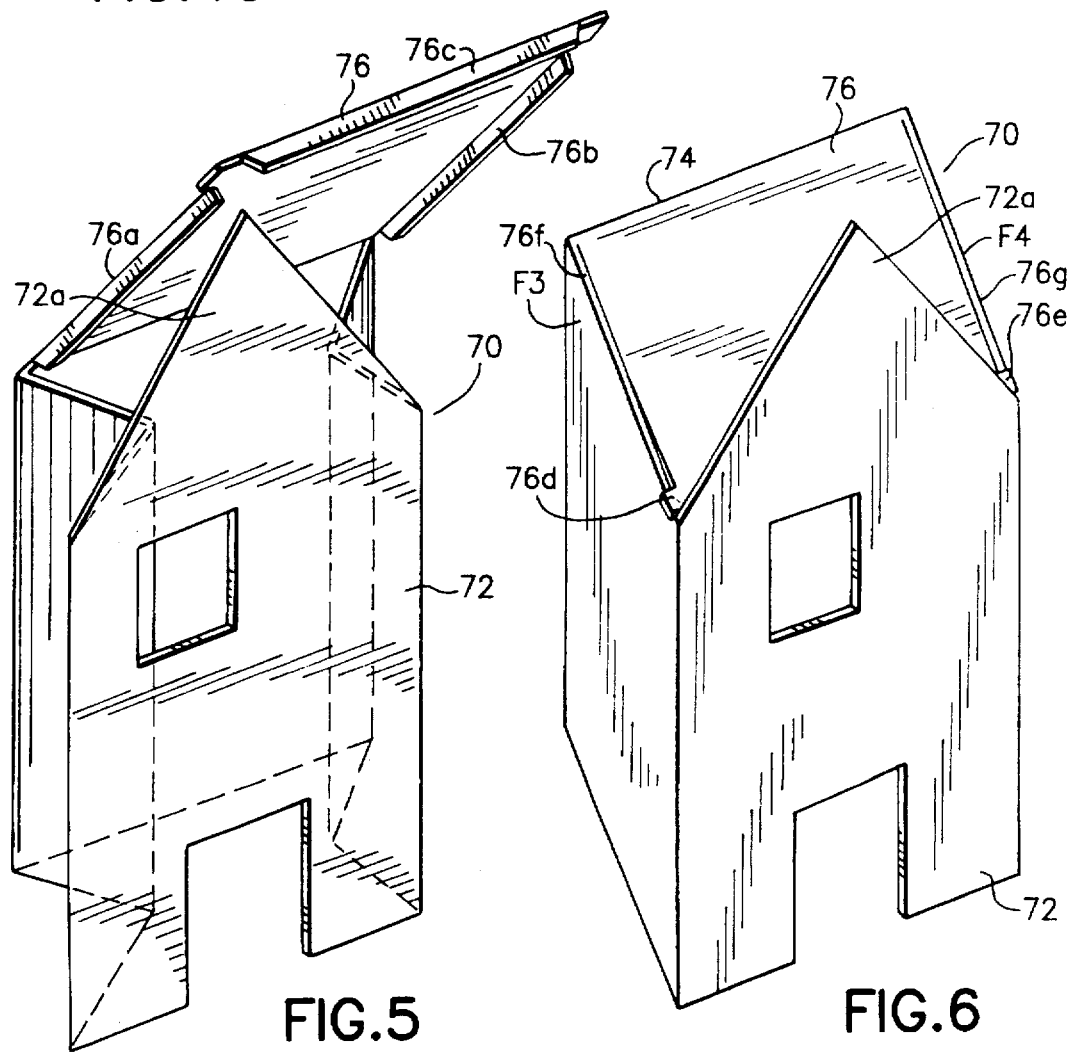
FIG. 5 is a perspective view of an alternate embodiment for a collapsible pet house structure, shown in a partially collapsed state.
FIG. 6 is a perspective view of the alternate embodiment for a collapsible pet house structure as in FIG. 5, shown in an open, erect position of use.

FIG. 5 shows a partially folded or collapsed pet play house 70 while FIG. 6 shows the assembled or erected view of pet play house 30, which is a one-piece design that is very easy to assemble with no tools. The material of front wall 72, rear wall 74 and side folded walls F3, F4 is a heavy cardboard preferably with a carpet covering. Top lid 76 keeps the erected structure rigid by virtue of downwardly extending its side flaps 76a, 76b and the front flap 76c which side flaps 76a, 76b and front flap 76c fit inside side folded walls F3, F4 and front facade wall 72. Two optional horizontally extending wings 76d, 76e at the front sides 76f, 76g of the lid 76 stop the lid 76 from going too far down into the pet playhouse structure 70, and wings 76d, 76e facilitate as lift tabs to collapse pet playhouse structure 70 for storage.

Figure 7:
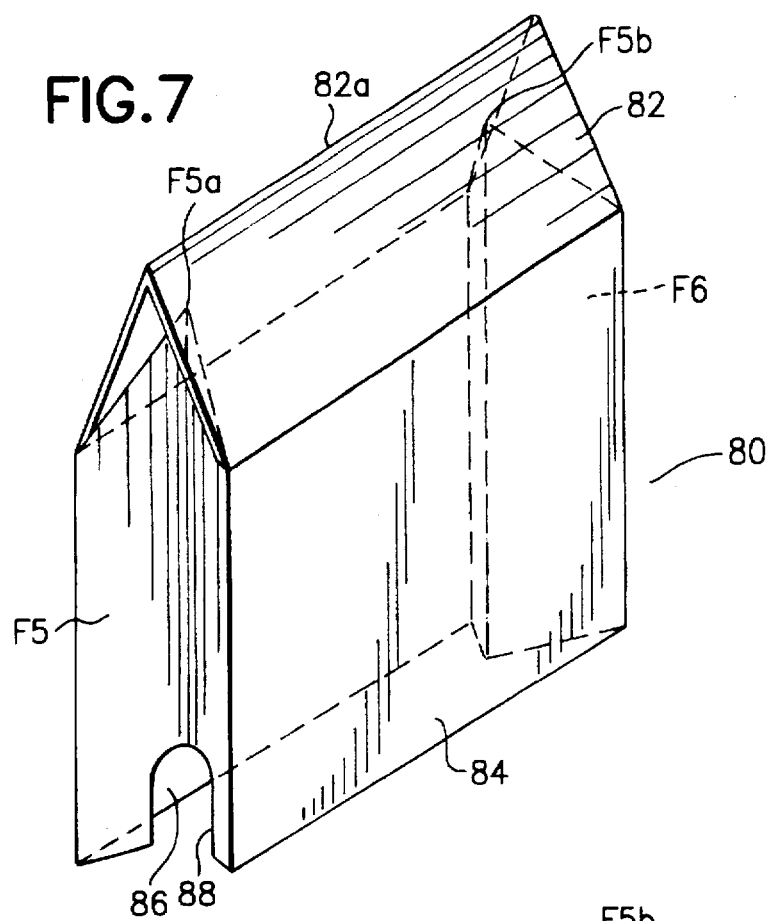
FIG. 7 is a persepctive view of a further alternate embodiment for a collapsible pet house structure, shown in a partially collapsed state.

FIG. 7 shows a one-piece collapsible dog house 80 with integral peaked roof 82; front panel 84, rear panel 86 and side folded walls F5, F6. Sidewall F5 includes cut out door recess 88. As shown, dog house 80 folds into a flat structure and erects instantly. Details such as locking tabs attaching peaks F5a, F5b of the fold-in walls F5, F6 to the peak 82a of the roof 82 are not shown. Many different materials can be used to accommodate different size dog and varied weather conditions. Insulated panels can be used.

Figure 8:
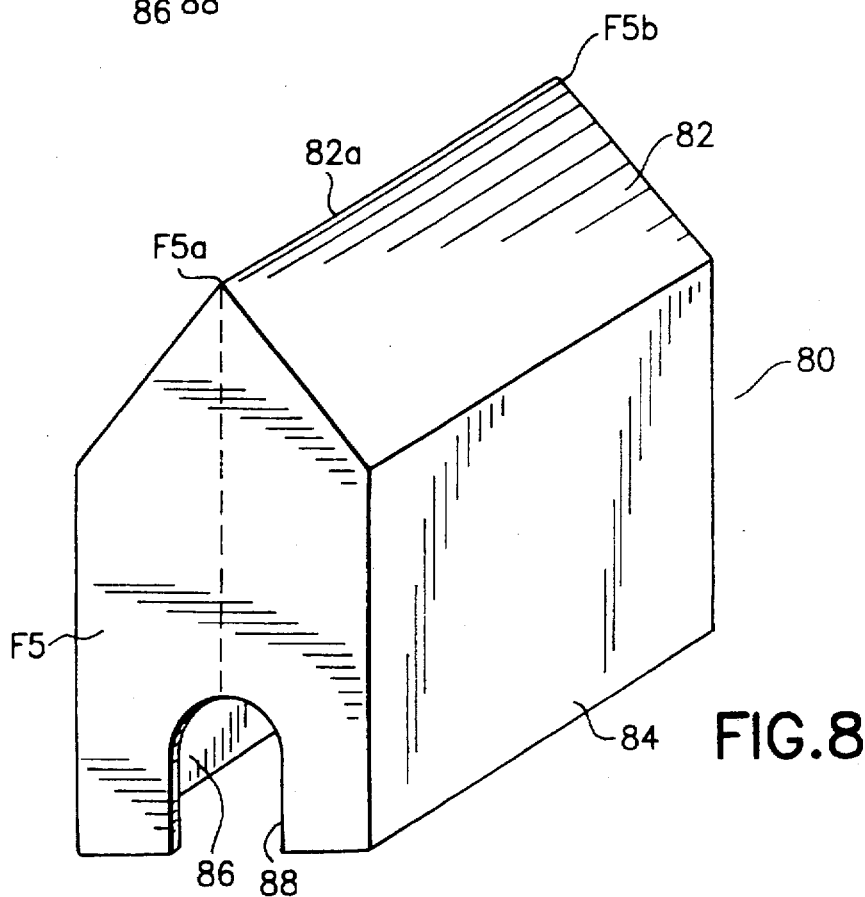
FIG. 8 is a perspective view of the further alternate embodiment for a collapsible pet house structure, as in FIG. 7, shown in an open, erect position of use.
Figure 9:
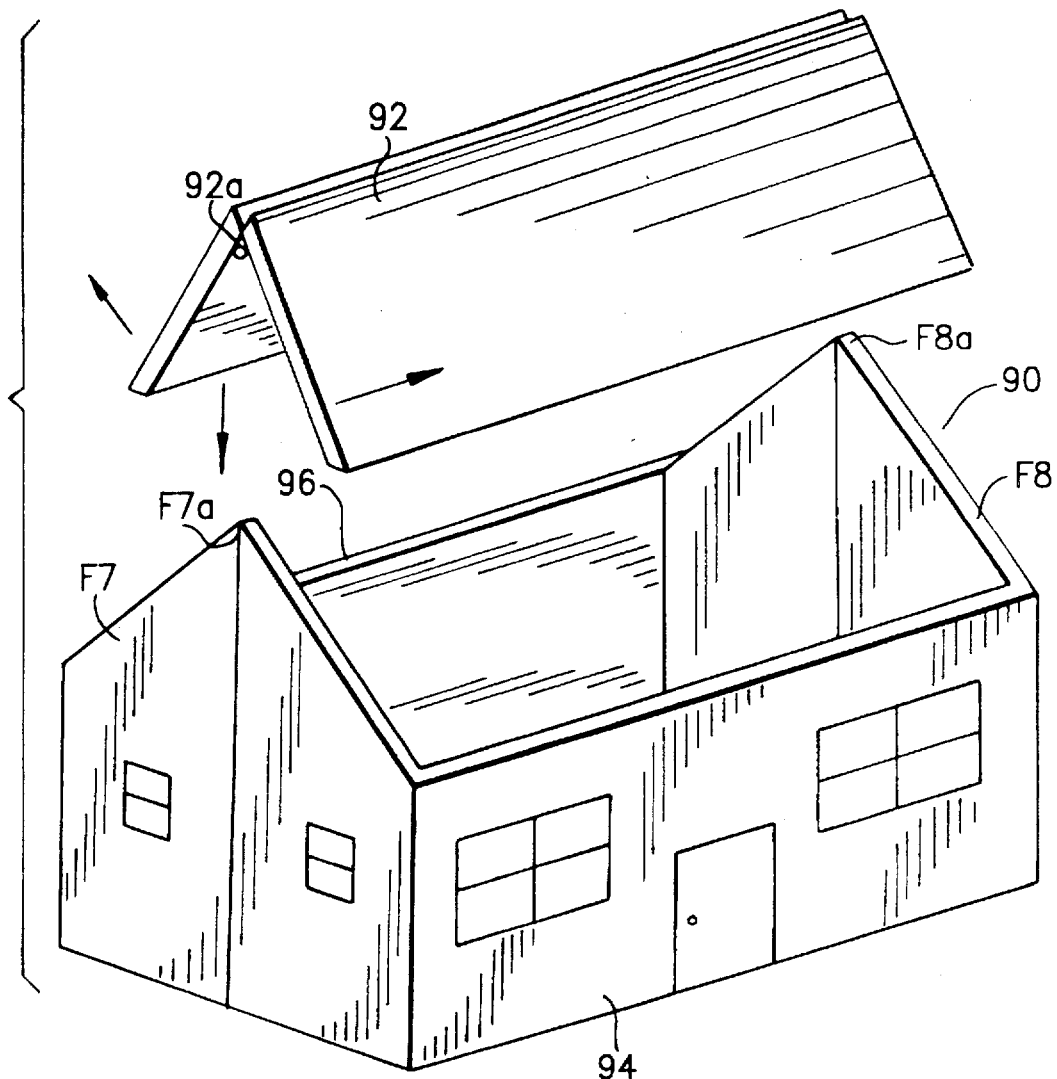
FIG. 9 is an exploded perspective view of an alternate embodiment for a collapsible modular ranch housing structure, shown with the roof removed.

Although the general structural design of collapsible dog house 80 of FIGS. 7 and 8 can be used for a ranch house, the structural design of FIG. 9 with a separate folding roof may also be appropriate. Collapsible modular house structure 90 includes hinged front wall 94, rear wall 96, folded side walls F7, F8 having peaks F7a, F8a joinable to hinged peak 92a of roof 92, which roof 92 further included hinged panels 92b, 92c joined at peak 92a of roof 92. House structure 90 can be shipped as two pieces avoiding the "wide load" problem with normal modular housing. It is very easy to erect on a foundation on site. A two story house with separate second floor slab or a hinged floor slab is also possible.

Figure 10:
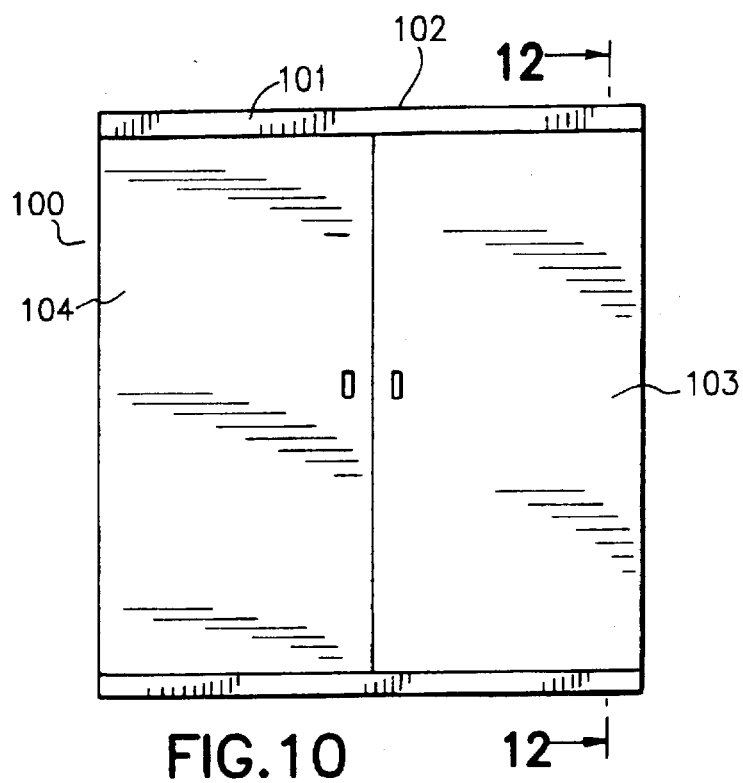
FIG. 10 is a front elevational view for an alternate embodiment for a collapsible closet structure.
Figure 12:
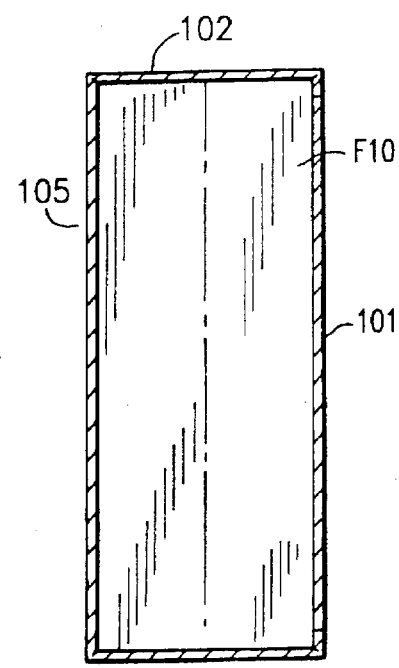
FIG. 12 is a side elevational view of the collapsible closet structure as in FIG. 10, taken along line 12—12 of FIG. 10.
Figure 11:
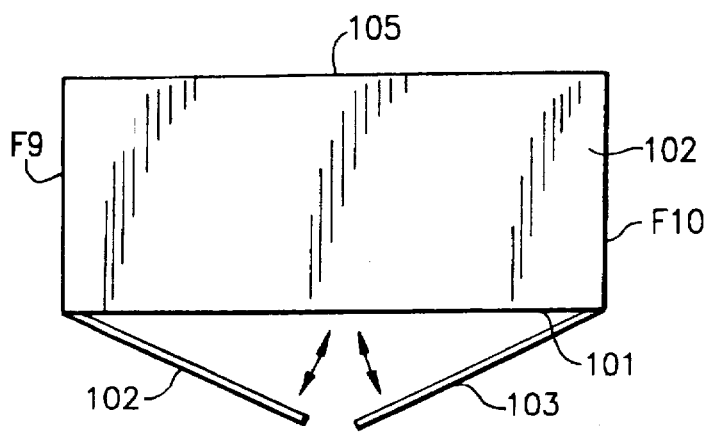
FIG. 11 is a top plan view of the collapsible closet structure as in FIG. 10, shown in an open, erect position, with the doors partially opened.
Figure 13:
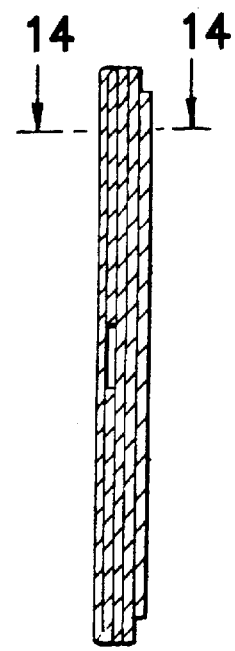
FIG. 13 is a side elevational view of the collapsible closet structure as in FIG. 10, shown in a collapsed position.
Figure 14:
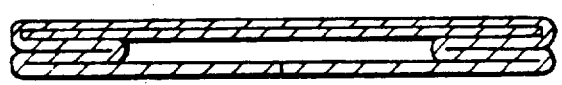
FIG. 14 is a top plan view of the collapsible closet structure as in FIG. 10, taken along line 14—14 as in FIG. 13.

FIGS. 10–14 show the details of a one-piece fold-up closet 100. This is a design for a small closet or for a large unit which could be six feet tall. Closet 100 includes front frame 101 with fold out doors 103, 104 panel 102, rear panel 105 and and folded side panels F9, F10. FIG. 11 shows the hinged door panels 103, 104 swinging into position into the erected closet 100 in the open position. FIG. 10 is a front view which is also a view of the folded closet which would be nominally as deep as four material thicknesses. FIG. 14 shows a top view of the folded closet 100 with top and bottom panels and/or shelves folded flat.

There are a variety of other play house and furniture pieces which can be made utilizing the basic fold-in structure of the present invention. It is noted that other modifications may be made to the present invention, without departing from the scope of the present invention, as noted in the appended claims.

I claim:

1. A collapsible pet play house comprising a general rectangular enclosure having a predetermined width, length, and height, said enclosure being a continuous piece of foldable lightweight rigid material, said continuous piece of material having a front panel, a rear panel and two side panels, each said side panel having a hinged inward fold therein, said collapsible folding pet play house further comprising said rear panel having a foldable lid cover, said lid cover having a pair of downwardly extending side flaps and a front flap, said side flaps and said front flap fitting inside the sides and front of said enclosure wherein said front panel includes a faux gable peak.

2. The collapsible pet play house as in claim 1 wherein each said inward fold has a width one half the size of said predetermined width of said collapsible folding pet play house wherein further each said side panel is foldable on the center of said predetermined width.

3. The collapsible folding pet play house as in claim 2, wherein in a folded state the folded thickness of said collapsible folding pet play house is approximately four times the material thickness.

4. The collapsible folding pet play house as in claim 1 wherein said collapsible pet play house is made of corrugated cardboard, and wherein each said hinged inward fold further comprises a fold in said collapsible pet play house, wherein each said fold is folded in the longitudinal direction of the corrugations of said collapsible pet playhouse.

5. The collapsible folding pet play house as in claim 1 wherein said side panels of said enclosure are cut, and said side panels are attached with a strong pliable type of fabric hinge.

6. The collapsible folding pet play house as in claim 1, wherein said side panels are attached by separate loose pin hinges.

7. The collapsible pet playhouse as in claim 1 wherein said lid includes horizontally extending wings extending at the front sides of said lid to stop said lid from going too far down into said collapsible pet play house.

8. The collapsible pet playhouse as in claim 1 wherein said collapsible folding pet play house is covered by carpet material.

9. The collapsible folding pet play house as in claim 1 wherein at least one of said foldable panels includes at least one opening therein.

10. The collapsible folding pet play house as in claim 9 wherein said front panel includes said at least one opening therein.

11. The collapsible pet playhouse as in claim 1 wherein said collapsible folding pet play house is covered by carpet material.

12. A collapsible folding pet play house comprising a generally rectangular enclosure, said enclosure having a predetermined width, length and height, said enclosure being a continuous piece of foldable lightweight rigid material, said continuous piece of material having a front panel and a rear panel and two side panels said front panel and said rear panel each having a hinged inward fold therein wherein said front panel and said rear panel each includes a peak, each said peak having a top co-terminus with each said fold of said respective front and rear panels said peak engagable with a peaked roof insertable over said collapsible folding pet play house.

13. The collapsible pet play house as in claim 12 wherein each said inward fold has a width one half the size of said predetermined width of said collapsible folding pet play house wherein further each said foldable panel is foldable on the center of said predetermined width.

14. The collapsible folding pet play house as in claim 12, wherein in a folded state the folded thickness of said collapsible folding pet play house is approximately four times the material thickness.

15. The collapsible folding pet play house as in claim 12 wherein said collapsible pet play house is made of corrugated cardboard, and wherein each said hinged inward fold further comprises a fold in said collapsible pet play house, wherein each said fold is folded in the longitudinal direction of the corrugations of said collapsible pet playhouse.

16. The collapsible folding pet play house as in claim 12 wherein said foldable panels of said enclosure are cut, and said foldable panels are attached with a strong pliable type of fabric hinge.

17. The collapsible folding pet play house as in claim 12, wherein said side panels are attached by separate loose pin hinges.

18. The collapsible folding pet play house as in claim 12 wherein said front panel includes said at least one opening therein.

19. The collapsible folding pet play house as in claim 12 wherein at least one of said foldable panels includes at least one opening therein.

* * * * *